(12) United States Patent
Oomura et al.

(10) Patent No.: US 6,518,727 B2
(45) Date of Patent: Feb. 11, 2003

(54) CHARGING CONTROL SYSTEM FOR AIR CONDITIONER AND BATTERY

(75) Inventors: Mitsuyo Oomura, Hekinan (JP); Toshinobu Homan, Obu (JP); Hiroki Nakamura, Chiryu (JP); Tadashi Nakagawa, Nishikamo-gun (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/079,350

(22) Filed: Feb. 20, 2002

(65) Prior Publication Data

US 2002/0113576 A1 Aug. 22, 2002

(30) Foreign Application Priority Data

Feb. 21, 2001 (JP) ......................................... 2001-045290

(51) Int. Cl.[7] ............................................. H01M 10/46
(52) U.S. Cl. ....................................... 320/132; 320/135
(58) Field of Search ................................. 320/104, 121, 320/122, 123, 125, 127, 128, 130, 132, 135, 137, DIG. 11, DIG. 21, DIG. 36; 62/132, 230

(56) References Cited

U.S. PATENT DOCUMENTS

| 5,327,987 A | * | 7/1994 | Abdelmalek |
| 5,330,385 A | * | 7/1994 | Hotta et al. |
| 5,572,881 A | * | 11/1996 | Hotta et al. |

FOREIGN PATENT DOCUMENTS

| JP | 4-244417 | 9/1992 |
| JP | 8-244439 | 9/1996 |
| JP | 8-268036 | 10/1996 |
| JP | 9-76740 | 3/1997 |

* cited by examiner

Primary Examiner—Edward H. Tso
(74) Attorney, Agent, or Firm—Harness, Dickey & Pierce, PLC

(57) ABSTRACT

In a vehicle having a battery and a generator, when a residual charge amount of the battery is reduced to a first predetermined amount, a power-generation command is output to a generator, and the battery is charged by the generator driven by an engine. When the residual charge amount is reduced to a second predetermined amount lower than the first predetermined amount, plural air-conditioning electrical devices are stopped. Thereafter, when the residual charge amount of the battery is increased to be larger than the second predetermined amount, the electrical devices are started at different start times.

22 Claims, 9 Drawing Sheets

CHARGING CONTROL SYSTEM FOR AIR CONDITIONER AND BATTERY

CROSS-REFERENCE TO RELATED APPLICATION

This application is related to and claims priority from Japanese Patent Application No. 2001-45290 filed on Feb. 21, 2001, the content of which is hereby incorporated by reference.

BACKGROUND OF THE INVENTION

1. Field of the Invention

The present invention relates to a charging control system for a vehicle air conditioner and for a vehicle battery, which suitably controls a residual charge amount of the vehicle battery.

2. Description of Related Art

In a vehicle such as a hybrid vehicle having a driving motor, when a residual charge amount of a battery for supplying electrical power to the driving motor is small, an over-discharge may be occurred in the battery if the battery is continuously greatly discharged to vehicle electrical equipment, and the driving motor sometimes cannot drive the vehicle.

In an air conditioner for an electrical vehicle described in JP-A-8-244439, plural electrical heaters used as an auxiliary heating source are combined with a heat pump cycle including an electrical compressor. That is, in the air conditioner, a residual charge amount of a battery is detected, and a rotation speed of the electrical compressor is reduced in accordance with the reduction of the detected residual charge amount. Further, among the plural electrical heaters, the number of electrical heaters to be operated is reduced in accordance with the reduction of the detected residual charge amount. Thus, electrical power consumed for the air-conditioner is reduced in accordance with the reduction of the residual charge amount of the battery, thereby increasing a travelling distance of the electrical vehicle.

In the vehicle air conditioner, the other various electrical devices such as an interior electrical blower and an exterior electrical blower are provided in addition to the electrical compressor and the electrical heaters. Therefore, the residual charge amount of the battery is also affected by the operation of the other various electrical devices. However, this document does not specifically disclose a method for electrically controlling the other various electrical devices.

SUMMARY OF THE INVENTION

In view of the foregoing problems, it is an object of the present invention to provide a charging control system for a vehicle, which suitably controls a residual charge amount of a battery while air-conditioning performance of a vehicle air conditioner can be improved.

According to the present invention, in a vehicle having a battery for supplying electrical power to plural air-conditioning electrical devices and a generator for charging the battery, when a residual charge amount of the battery is reduced to a first predetermined amount, operations of the plural air-conditioning electrical devices are stopped, a power generation command is outputted to a generator for charging the battery. Further, when the residual charge amount is increased to be larger than the first predetermined amount after the plural air-conditioning electrical devices are stopped, the plural air-conditioning electrical devices are re-started at different start times. Alternatively, when the residual charge amount is increased to be larger than the first predetermined amount after the plural air-conditioning electrical devices are stopped, the plural air-conditioning electrical devices are re-started at the same time by small operation levels, respectively. Accordingly, it can prevent the residual charge amount of the battery from being reduced and the battery from being excessively discharged, thereby preventing the vehicle from being incapable of moving due to the excessive discharge of the battery. Further, after the plural air-conditioning electrical devices are re-started, power consumption of the plural air-conditioning electrical devices is not rapidly increased. Therefore, the residual charge amount of the battery is not reduced again to the first predetermined amount due to the re-starting operation of the air-conditioning electrical devices. As a result, the air-conditioning electrical devices can be smoothly re-started while it can restrict the operation of the air-conditioning electrical devices from being re-stopped due to the control of the residual charge amount of the battery.

Preferably, when the residual charge amount of the battery is reduced to a second predetermined amount larger than the first predetermined amount, a power generation command for operating the generator is output so that the battery is charged by the generator. That is, only in an emergency case where the residual charge amount of the battery is reduced to the first predetermined amount, the plural air-conditioning electrical devices are stopped. Accordingly, the air-conditioning prohibition operation for the plural air-conditioning electrical devices is only limited to the specific emergency case.

Preferably, after the air-conditioning electrical devices are re-started, operation levels of the air-conditioning devices are gradually increased from the small operation levels toward necessary operation levels required for performing air-conditioning operation in the passenger compartment, respectively. Therefore, it can prevent the consumption power of the air-conditioning electrical devices from being rapidly increased after the re-starting operation, while air conditioning capacity can be smoothly improved.

BRIEF DESCRIPTION OF THE DRAWINGS

Additional objects and advantages of the present invention will be more readily apparent from the following detailed description of preferred embodiments when taken together with the accompanying drawings, in which.

DETAILED DESCRIPTION OF THE PRESENTLY PREFERRED EMBODIMENTS

Preferred embodiments of the present invention will be described hereinafter with reference to the accompanying drawings.

Figure 1:
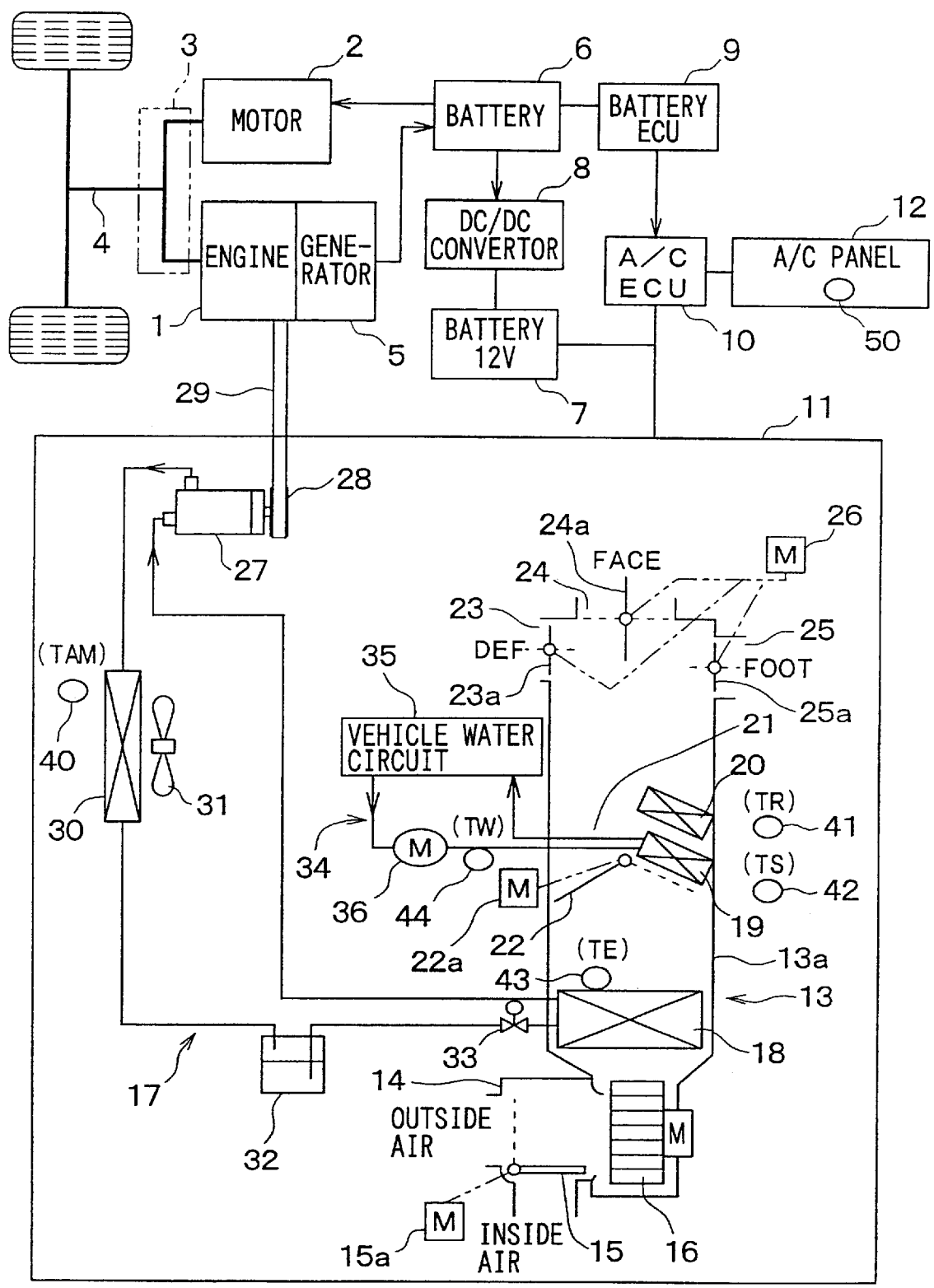
FIG. 1 is a schematic diagram showing an entire system according to a first embodiment of the present invention.

A first embodiment of the present invention will be now described with reference to FIGS. 1–3 and 4A–4F. In the first embodiment, the present invention is typically applied to a hybrid vehicle. As shown in FIG. 1, the hybrid vehicle includes both of an engine (internal combustion engine) 1 and a motor (electrical driving motor) 2 as a driving source for driving the vehicle.

A motive-power switching mechanism 3 is disposed to switch a motive-power transmission state, among a transmission state from only the engine 1 to a vehicle shaft 4, a transmission state from only the motor 2 to the shaft 4 and a transmission state from both of the engine 1 and the motor 2 to the shaft 4. A generator 5 is connected to an output shaft of the engine 1, and is rotated by the engine 1 to generate electrical power. A main battery 6, for driving the vehicle, is charged by the generator 5, and supplies electrical power to the motor 2. Because the main battery 6 is for supplying electrical power to the driving motor 2, a charging voltage of the main battery 6 has a high value of about 300V.

A supplementary battery 7 having a charging voltage greatly lower than that of the main battery 6 is provided. The supplementary battery 7 is charged to a predetermined low voltage (e.g., 12V) by the main battery 6 through a DC-DC converter 8. The supplementary battery 7 supplies electrical power to vehicle equipments such as air-conditioning electrical devices described later.

A battery controller (battery ECU) 9 determines a residual charge amount of the main battery 6, and controls operation of the engine 1 used as a driving source of the generator 5. Thus, the battery ECU 9 controls the residual charge amount of the main battery 6. For example, a sensor, for detecting specific gravity of an electrolyte in the main battery 6, is provided, and the battery ECU 9 determines the residual charge amount of the main battery 6 based on a detection signal from the sensor. Alternatively, the battery ECU 9 can calculate and estimate the residual charge amount of the main battery 6 by integrating a charging current of the main battery 6 and a charging time, and by integrating a discharging current of the main battery 6 and a discharging time.

An air-conditioning controller (air-conditioning ECU) 10 controls operations of various air-conditioning electrical devices (e.g., actuators) provided in an air conditioner 11. Operation signals are inputted to the air-conditioning ECU 10 from operation members provided on an air-conditioning operation panel 12. Detection signals are also inputted to the air-conditioning ECU 10 from a sensor group 40-44 and the likes described later. Further, an air-conditioning prohibition signal is input to the air-conditioning ECU 10 from the battery ECU 9. Each of the battery ECU 9 and the air-conditioning ECU 10 is constructed by a microcomputer and a peripheral circuit. The battery ECU 9 and the air-conditioning ECU 10 can be integrally constructed by a single microcomputer.

Next, a structure of the air conditioner 11 will be described. The air conditioner 11 is mainly constructed by an interior ventilation system, a refrigerant cycle system and a hot-water circuit system. First, an interior air-conditioning unit 13, for forming the interior ventilation system, will be now described. The interior air-conditioning unit 13 includes an air-conditioning case 13a generally disposed inside an instrument panel in a passenger compartment on a front side. An inside/outside air switching box (switching box) 14, for switching and introducing inside air or outside air by an inside/outside air switching door (switching door) 15, is disposed at a most upstream air side of the air-conditioning case 13a. The switching door 15 is driven by an actuator 15a such as a servomotor.

Air, introduced from the switching box 14, is blown into the passenger compartment through the air-conditioning case 13a by a centrifugal-type electrical interior blower (front interior blower) 16. An evaporator 18 of a refrigerant cycle system 17 is disposed at a downstream air side of the front interior blower 16 to be used as a cooling heat exchanger for cooling air passing therethrough. A heater core 19, for heating air using hot water as a heat source, is disposed at a downstream air side of the evaporator 18. An electrical heater 20 is disposed directly behind the heater core 19 to be used as an auxiliary heating source for heating air.

Further, a bypass passage 21, through which air from the evaporator 18 bypasses the heater core 19 and the electrical heater 20, is provided at a lateral side of the heater core 19 and the electrical heater 20 within the air-conditioning case 13a. An air mixing door 22, for adjusting a ratio between an amount of cool air passing through the bypass passage 21 and an amount of warm air passing through the heater core 19, is rotatably disposed at an upstream side of the heater core 19. The air mixing door 22 is a temperature adjusting unit for adjusting the temperature of air blown into the passenger compartment by adjusting the ratio of the cool air amount and the warm air amount. The air mixing door 22 is driven by an actuator 22a such as a servomotor.

The air-conditioning case 13a has a defroster opening 23, a face opening 24 and a foot opening 25, at a most downstream air side. Therefore, conditioned air is blown toward an inner surface of a windshield through the defroster opening 23, is blown to the upper half body of a passenger through the face opening 24, and is blown to the foot area of the passenger through the foot opening 25. These openings 23, 24, 25 are opened and closed by mode switching doors 23a, 24a, 25a, respectively. These mode switching doors 23a, 24a, 25a are driven by an actuator 26 such as a servomotor through a link mechanism (not shown) and the like. Thus, an air outlet mode such as a face mode, a bi-level mode, a foot mode, a foot/defroster mode and a defroster mode can be selectively set.

Next, the refrigerant cycle system 17 will now be described. The refrigerant cycle system 17 includes a compressor 27 for compressing and discharging refrigerant. The compressor 27 is driven by the engine 1 through a solenoid clutch 28, a belt 29 and the like. High-pressure gas refrigerant, discharged from the compressor 27, is heat-exchanged with outside air in a condenser 30, to be cooled and condensed in the condenser 30. Outside air is blown toward the condenser 30 by an electrical exterior blower 31. Refrigerant, condensed in the condenser 30, is separated into gas refrigerant and liquid refrigerant in a receiver (gas-liquid separator) 32, and separated liquid refrigerant flows from the receiver 32 toward a decompression device 33. Therefore, high-pressure liquid refrigerant is decompressed and expanded to be in a low-pressure gas-liquid refrigerant in the decompression device 33 constructed by a thermal expansion valve and the like. Refrigerant decompressed in the decompression device 33 is heat-exchanged with air in the evaporator 18 to absorb heat from air. Thus, low-pressure refrigerant is evaporated in the evaporator 18, and air passing through the evaporator 18 is cooled. Gas refrigerant evaporated in the evaporator 18 is sucked into the compressor 27, and is compressed again in the compressor 27.

Next, a hot water circuit 34 of the heater core 19 will be now described. The hot water circuit 34 is connected to a vehicle-side hot water circuit 35 including the engine 1. Hot water, heated in the vehicle-side hot water circuit 35, is circulated to the heater core 19 by an electrical water pump 36. That is, engine-cooling water for cooling the engine 1 is used as the heating source.

In the first embodiment, the sensor group, for performing an air-conditioning automatic control, includes an outside air temperature sensor 40, an inside air temperature sensor 41, a solar radiation sensor 42, an evaporator air temperature sensor (evaporator cooling-degree detection device) 43, a water temperature sensor 44 and the like. The outside air temperature sensor 40 detects an outside air temperature TAM outside the passenger compartment, and the inside air temperature sensor 41 detects an air temperature (inside air temperature) TR in the passenger compartment. The solar radiation sensor 42 detects an amount (solar radiation amount) TS of sunlight radiated into the passenger compartment. The evaporator air temperature sensor 43 detects a temperature TE of air blown from the evaporator 18, and the water temperature sensor 44 detects a temperature TW of the hot water circulated to the heater core 19.

On the air-conditioning operation panel 12, operation members such as an air-conditioning switch, an inside/outside air changing-over switch, a temperature setting switch, an air-amount changing-over switch, an air-outlet mode changing-over switch and the like are provided. The air-conditioning switch commands starting operation and stopping operation of the refrigerant cycle system 17 (compressor 27), and the inside/outside air changing over switch switches any one of an outside air suction mode and an inside air suction mode in the switching box 14. The temperature setting switch sets an air temperature blown into the passenger compartment at a required temperature, and the air-amount changing-over switch switches an amount of air blown by the front interior blower 16. The air outlet mode changing-over switch switches one air outlet mode, among the face mode, the foot mode, the bi-level mode, the foot/defroster mode and the defroster mode. In addition, on the air-conditioning operation panel 12, an indicator 50 for indicating air-conditioning prohibition is also disposed. Specifically, the indicator 50 is constructed by a light emitting diode (LED) and the like for lighting during the air-conditioning prohibition.

The air-conditioning unit 13 is disposed for performing air conditioning operation for the front seat side in the passenger compartment. In the first embodiment, a rear air-conditioning unit (not shown) can be also provided at the rear seat side of the passenger compartment so that conditioned air in the rear air-conditioning unit is blown toward the rear seat side of the passenger compartment. Similarly to the front air conditioning unit 13, the rear air-conditioning unit also includes an evaporator, a heater core and air-conditioning electrical devices such as a blower, and actuators.

Next, control operation according to the first embodiment will be now described. First, a relationship between the residual charge amount of the main battery 6 and control output from the battery ECU 9 for determining the residual charge amount is described. In the present example, as shown in FIG. 2, the control output from the battery ECU 9 is set to be changed in accordance with a change of the residual charge amount.

Figure 2:
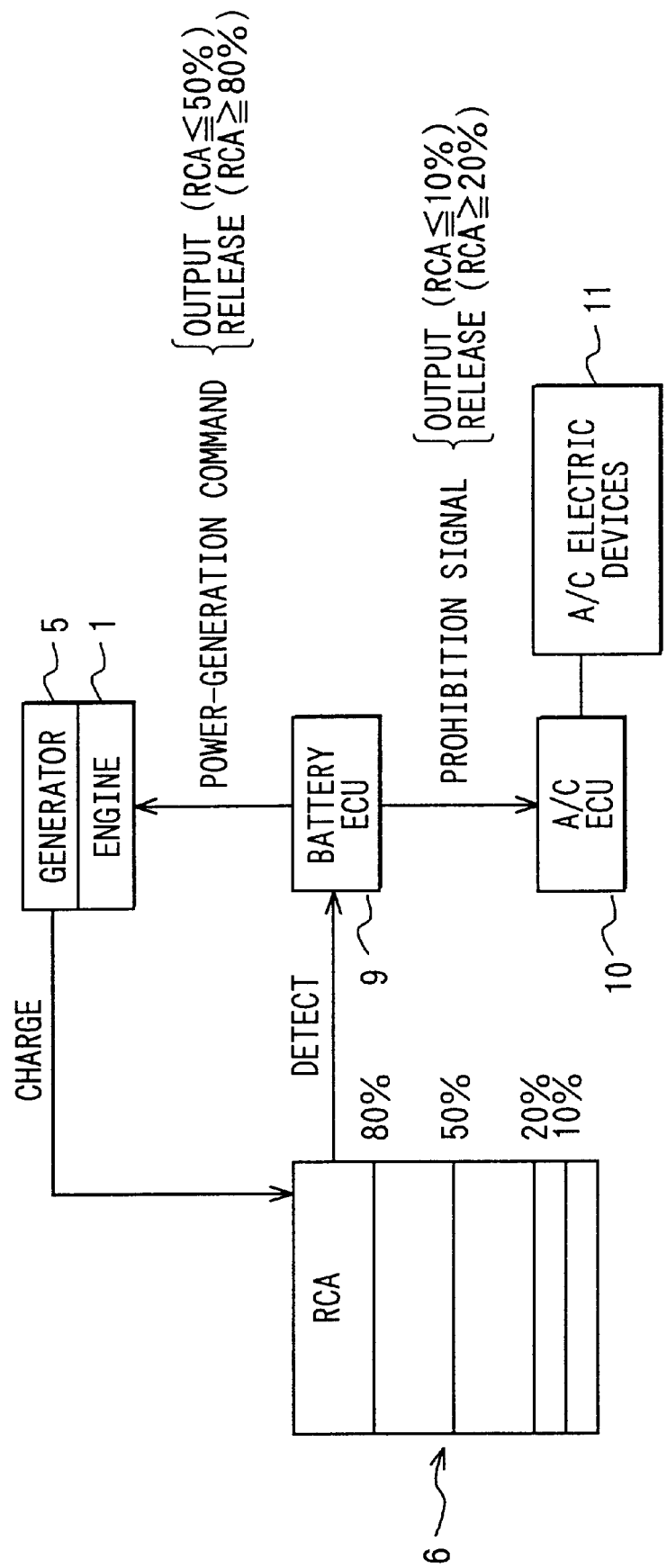
FIG. 2 is a block diagram for explaining control operation of a battery controller according to the first embodiment.

In the example shown in FIG. 2, the battery ECU 9 performs the control output in accordance with the change of the residual charge amount (RCA) set at four thresholds. That is, when the residual charge amount (RCA) of the main battery 6 is reduced to an amount equal to or lower than 50%, the battery ECU 9 outputs a power-generation command signal to an engine controller (engine ECU, not shown) of the engine 1. In this case, the main battery 6 is charged by the generator 5. When the residual charge amount (RCA) recovers to be equal to or higher than 80%, the output of the power-generation command signal is stopped. That is, in this case, the power-generation command signal is released.

Specifically, when the power-generation command signal is outputted from the battery ECU 9 to the engine ECU, an operation command for operating the engine 1 is outputted from the battery ECU 9 to the engine ECU, so that the engine 1 is operated, and the generator 5 is driven by the engine 1. Therefore, the generator 5 generates electrical power to charge the main battery 6. When the power-generation command signal is released, the output of the power-generation command signal for controlling the residual charge amount (RCA) is stopped.

When the residual charge amount (RCA) of the main battery 6 is reduced to be equal to or lower than 10%, the battery ECU 9 outputs the air-conditioning prohibition signal to the air-conditioning ECU 10 as an emergency signal for preventing a vehicle from being incapable of moving. In this case, operations of various air-conditioning electrical devices of the air conditioner 11 are prohibited at the same time, so that power consumption for the air-conditioning electrical devices is stopped. When the residual charge amount recovers to an amount equal to or higher than 20%, the air-conditioning prohibition signal is released, and the electrical devices of the air conditioner 11 are recovered to an operational state.

Next, specific control operation of a charging control system according to the first embodiment is described with reference to FIG. 3. At step S10, the air-conditioning ECU 10 reads sensor signals from the sensor group 40-44, operation signals from the air-conditioning operation panel 12 and the likes. Next, at step S20, it is determined whether or not the air conditioner 11 is started using signals read at step S10. That is, the start of the air conditioner 11 is determined by the turning-on signal from the air-amount changing-over switch and the like on the air-conditioning operation panel 12. When the air conditioner 11 is not started, the control program proceeds to step S30. At step S30, a timer described later is initialized, and a control routine is ended. When the air conditioner 11 is started at step S20, it is determined whether or not the air-conditioning prohibition signal is output from the battery ECU 9. Here, the air-conditioning prohibition signal is for prohibiting the operations of various electrical devices of the air-conditioner 11 at the same time.

The supplementary battery 7, used as a power source for the electrical devices of the air conditioner 11, is charged by the main battery 6 through the DC—DC converter 8. Accordingly, when a large amount of electrical power is consumed by the electrical devices of the air conditioner 11, the residual charge amount of the supplementary battery 7 is reduced, and therefore, the supplementary battery 7 is charged again by the main battery 6. Thus, in this case, the residual charge amount of the main battery 6 is reduced, and the vehicle sometimes may become incapable of moving.

In the first embodiment, the residual charge amount of the main battery 6 is determined in the battery ECU 9. When the residual charge amount of the main battery 6 becomes equal to or lower than a predetermined amount (e.g., 10%), the air-conditioning prohibition signal is output from the battery ECU 9 to the air-conditioning ECU. 10.

Since the air-conditioning prohibition signal is not output in a normal operation, the control program proceeds to step S50, and the following normal air-conditioning control is performed at step S50. That is, at step S50, an air-amount control of the front interior blower 16, an air-amount control of the rear interior blower, an air amount control of the exterior blower 31, a heating amount control of the electrical heater 20, an operation control of the compressor 27, an operation control of the electrical water pump 36, and the like are performed. Specifically, in the air-amount control of the front interior blower 16, a voltage BLW applied to a driving motor of the front interior blower 16 is switched stepwise at plural voltages. In the air-amount control of the rear interior blower, a voltage BLW applied to a driving motor of the rear interior blower is switched stepwise at plural voltages. In the air-amount control of the exterior blower 3, the air amount of the exterior blower 3 is switched among a stop (OFF), a low air amount (LO) and a high air amount (HI). In the heating amount control of the electrical heater 20, a heating amount is switched among a stop (OFF), a low heating amount (LO) and a high heating amount (HI). In the control operation of the compressor 27, a control state of the compressor 27 is switched between a stop state (OFF) and an operation state (ON). Further, in the control operation of the electrical water pump 36, a control state is switched between a stop state (OFF) and an operation state (ON).

The above air-conditioning control operations can be manually set based on the operational signals from the air-conditioning operation panel 12, or can be automatically set. When the air-conditioning control operations are automatically controlled, a target temperature TAO of air to be blown into the passenger compartment is calculated. The target temperature TAO is used as a basic target value, and the above air-conditioning control operations are performed based on the target temperature TAO. Here, the target temperature TAO of air blown into the passenger compartment is for maintaining the temperature of the passenger compartment at a set temperature Tset. The target temperature TAO can be calculated based on the inside air temperature TR, the outside air temperature TAM, the solar radiation amount TS and the set temperature TS which relate to thermal loads for air-conditioning.

Also at the step S50, an inside/outside air suction mode is determined by the switching door 15, the temperature of air to be blown into the passenger compartment is controlled by the air mixing door 22, and the air outlet mode is switched by the mode switching doors 23a, 24a, 25a.

Next, at step S60, it is determined whether an air-conditioning prohibition flag is set at "1". The air-conditioning prohibition flag is set at "1" at step S70 described later only when it is determined that the air-conditioning prohibition signal is output at the step S40. Otherwise, the flag is reset to "0". Therefore, it is determined that the flag is not set at "1" at the step S60, and the control program proceeds to the step S30, and the timer is initialized and a control routine is ended.

When the residual charge amount of the main battery 6 becomes equal to or lower than the predetermined amount and the air-conditioning prohibition signal is output from the battery ECU 9, the determination of step S40 is YES. In this case, at step S70, all of the plural air-conditioning electrical devices are stopped, and an air-conditioning operation is stopped. That is, all of the front interior blower 16, the rear interior blower, the exterior blower 31, the electrical heater 20, the compressor 27, the electrical water pump 36 and the like are stopped. Also at step S70, the air-conditioning prohibition flag is set at "1". Here, at step S70, all of the plural air-conditioning electrical devices can be stopped at the same time.

When the air-conditioning operation is stopped, the discharged amount of the supplementary battery 7 is reduced, and the discharged amount of the main battery 6 is also reduced. That is, the power consumption of the air-conditioning electrical devices is stopped by outputting the air-conditioning prohibition signal, so that a charging-discharging balance of the main battery 6 is improved and the residual charge amount of the main battery 6 can be recovered. As a result, the main battery 6 can be prevented from being excessively discharged.

When the residual charge amount of the main battery 6 is recovered to be equal to or higher than the predetermined amount (e. g., 20%) after the air-conditioning operation is stopped at the step S70, the air-conditioning prohibition signal is released in the battery ECU 9. That is, since the battery ECU 9 stops the output of the air-conditioning prohibition signal, the determination of step S40 becomes NO, and the normal air-conditioning operation is performed at step S50. Then, the control program proceeds to step S60, and the determination at step S60 is YES because the air-conditioning prohibition flag has already set at "1" at step S70. Next, the control program proceeds to step S80, and counting of the timer is started at step S80. Thereafter, at step S90, a different start-timing control is performed for starting the plural air-conditioning electrical devices, based on time "t" passing after the output of the air-conditioning prohibition signal is stopped.

Figure 4A:
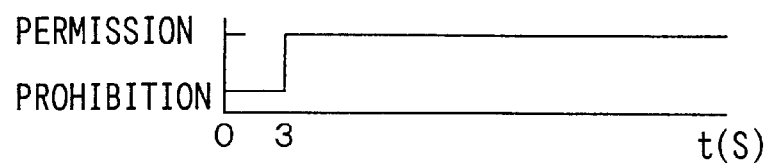
FIGS. 4A–4F are graphs showing control operations of various air-conditioning electrical devices after an air-conditioning prohibition signal is released, according to the first embodiment.
Figure 4B:
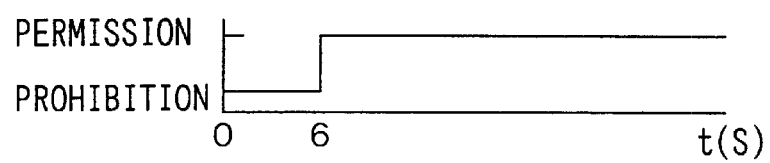
Figure 4C:
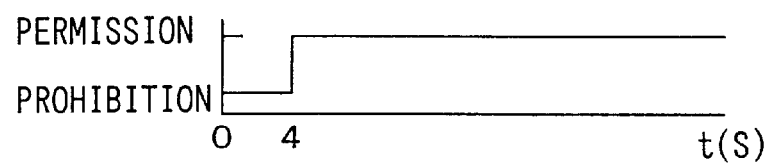
Figure 4D:
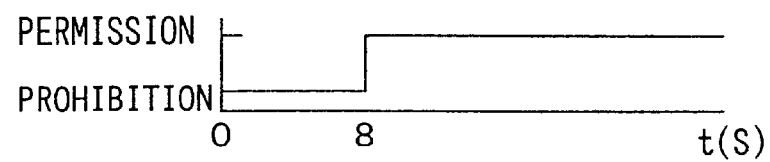
Figure 4E:
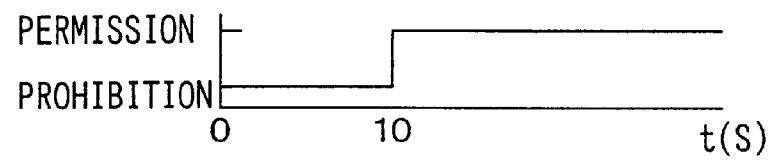
Figure 4F:
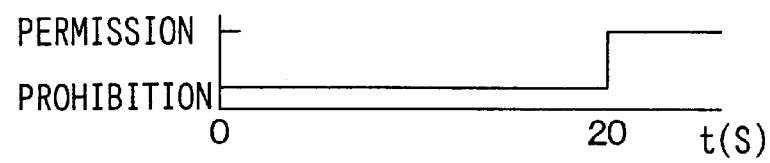

Specific example at step S90 is shown in FIGS. 4A–4F. In FIGS. 4A–4F, the abscissa indicates the time "t" passed after the output of the air-conditioning prohibition signal is stopped. At step S80, the time "t" is counted by the timer after the output of the air-conditioning prohibition signal is stopped. FIG. 4A shows a control operation of the front interior blower 16, FIG. 4B shows a control operation of the rear interior blower, FIG. 4C shows a control operation of the compressor 27, FIG. 4D shows a control operation of the exterior blower, FIG. 4E shows a control operation of the electrical water pump 36, and FIG. 4F shows a control operation of the electrical heater 20. As shown in FIG. 4A, when the passing time "t" is 3 seconds, the front interior blower 16 is permitted to be operated firstly, and is operated by an air amount determined at step S50. When the passing time "t" is 4 seconds, the compressor 27 is permitted to be operated, and is started again as shown in FIG. 4C. When the passing time "t" is 6 seconds, as shown in FIG. 4B, the rear interior blower is permitted to be operated, and is operated by an air amount determined at step 50. When the passing time "t" is 8 seconds, as shown in FIG. 4D, the exterior blower 31 is permitted to be operated, and is operated by an air amount determined at step S50. When the passing time "t" is 10 seconds, as shown in FIG. 4E, the electrical water pump 36 is permitted to be operated, and is again started.

Finally, when the passing time "t" is 20 seconds, as shown in FIG. 4F, the electrical heater 20 is permitted to be operated, and is again started by a heating amount determined at step S50. That is, the air-conditioning electrical devices are again started at different start times by the normal control amounts determined at step S50 in FIG. 3, respectively.

In the first embodiment, the plural air-conditioning electrical devices are not symmetrically started, but the starting times of the air-conditioning electrical devices are set to be different from each other. Therefore, power consumption of the air-conditioning electrical devices does not rapidly increase after the output of the air-conditioning prohibition signal is stopped in the battery ECU 9. Accordingly it can prevent a repeat (hunting) of the re-starting of the air-conditioning electrical devices and the re-prohibiting thereof from being caused.

At step S100, it is determined whether or not a predetermined time t0 (e.g., 20 seconds), required to start all of the air-conditioning electrical devices, passes. When the determination at step S100 is YES, the air-conditioning prohibition flag is reset to "0".

In the different start-timing control of the plural air-conditioning electrical devices shown in FIGS. 4A–4F, for preferentially performing an air-conditioning operation at the front seat side, the front interior blower 16 is firstly started, and then the compressor 27 is started. Thereafter, the other air-conditioning electrical devices are sequentially started. Further, in the first embodiment, the indicator 50, which indicates the air-conditioning prohibition until the predetermined time t0 passes, is provided on the air-conditioning operation panel 12. Therefore, the passenger can find out the air-conditioning prohibition based on the operation of the indicator 50 (e.g., lighting of a light emitting diode). Accordingly, the passenger does not mistake the air-conditioning prohibition for trouble generation.

A second embodiment of the present invention will be described with reference to FIGS. 5A–5F. In the second embodiment, when the output of the air-conditioning prohibition signal is stopped, the plural air-conditioning electrical devices are started at the same time. At this time, each of the air-conditioning electrical devices are is started by a small operation level. Thereafter, the operation levels of the air-conditioning electrical devices are gradually increased toward the necessary air-conditioning levels required from the air-conditioning function in the passenger compartment, respectively.

Figure 3:
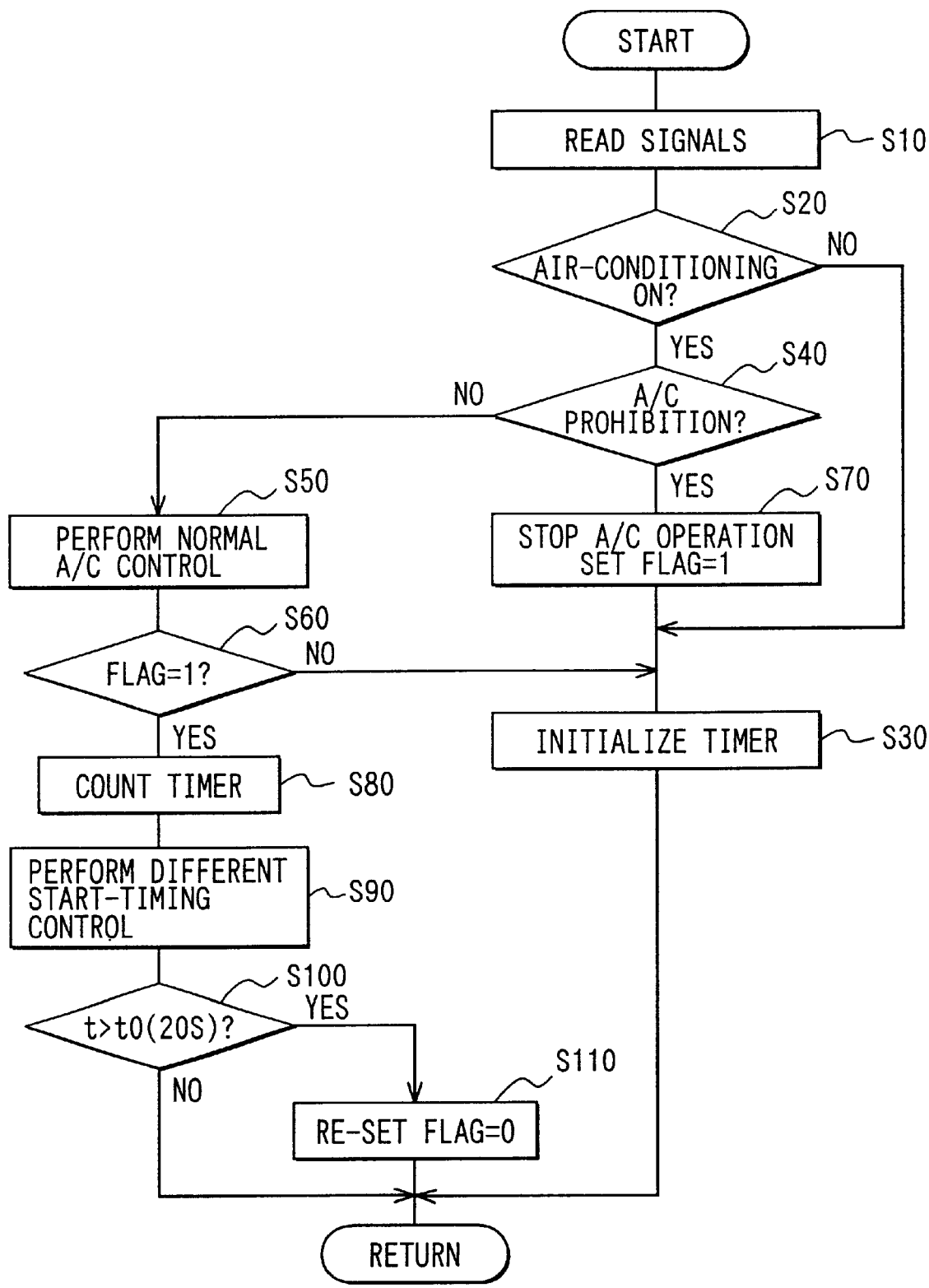
FIG. 3 is a flow diagram showing control operation of an air-conditioning controller, according to the first embodiment.
Figure 5A:
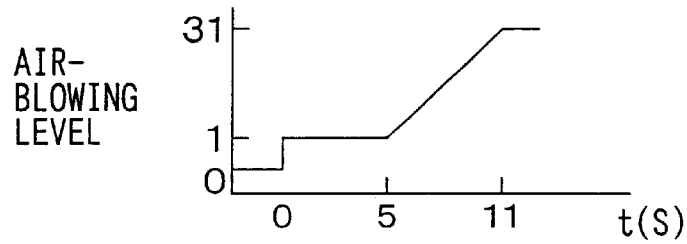
FIGS. 5A–5F are graphs showing control operations of various air-conditioning electrical devices after the air-conditioning prohibition signal is released, according to a second embodiment of the present invention.
Figure 5B:
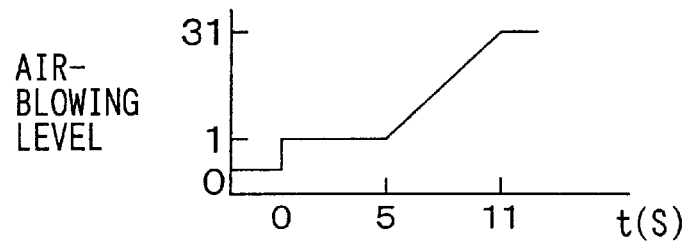
Figure 5C:
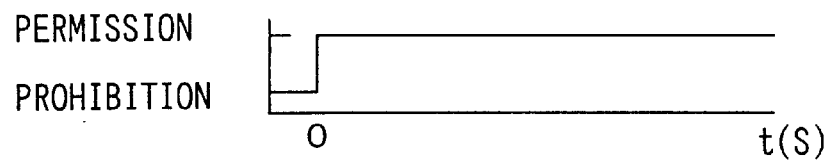
Figure 5D:
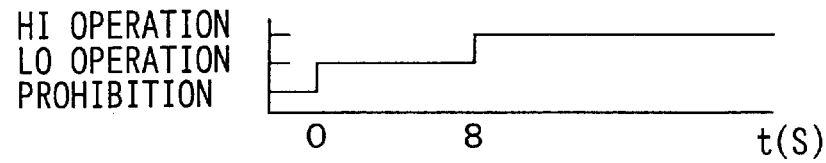
Figure 5E:
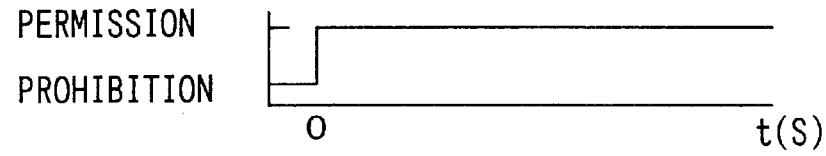
Figure 5F:
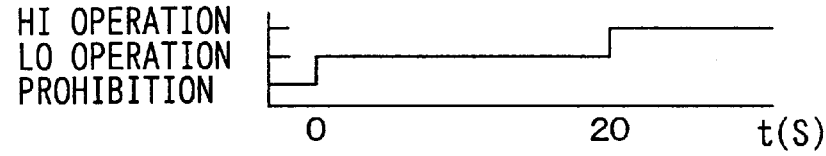

Specific control operations according to the second embodiment, shown in FIGS. 5A–5F, are performed at step S90 shown in FIG. 3. In the second embodiment, FIG. 5A shows a control operation of the front interior blower 16, FIG. 5B shows a control operation of the rear interior blower, FIG. 5C shows a control operation of the compressor 27, FIG. 5D shows a control operation of the exterior blower, FIG. 5E shows a control operation of the electrical water pump 36, and FIG. 5F shows a control operation of the electrical heater 20. In the present example, each air-blowing level of the front interior blower 16 and the rear interior blower can be switched between the smallest level "1" and the largest level "31". In this case, both of the front interior blower 16 and the rear interior blower are started at the smallest level "1" of the air-blowing amount, that is, at the smallest operation level (smallest power-consumption level). As shown in FIGS. 5A and 5B, each of the front interior blower 16 and the rear interior blower is maintained at the smallest level "1" of an air-blowing amount until 5 seconds passes after staring. Thereafter, each air-blowing amount of the front interior blower 16 and the rear interior blower is gradually increased toward the largest level "31". When 11 seconds passes after starting, each air-blowing amount of the front interior blower 16 and the rear interior blower is made to be the largest level "31".

The air-conditioning operation is temporarily stopped while the air-conditioning prohibition signal is output. Therefore, after the re-starting of the air-conditioning operation, the air-conditioning level for obtaining necessary air-conditioning function generally becomes maximum. Accordingly, in the second embodiment, each operation level of the air-conditioning electrical devices is increased from the smallest level toward the largest level, as shown in FIGS. 5A, 5B and 5D.

In the second embodiment, the air-blowing level of the exterior blower 31 for cooling the condenser 30 can be switched to a low air-blowing level LO and a high air-blowing level HI. The exterior blower 31 is firstly maintained at the low air-blowing level LO until 8 seconds passes after the starting of the exterior blower 31. Thereafter, the air blowing level of the exterior blower 31 is switched to the high blowing level HI. Similarly, the heating operation of the electrical heater 20 can be switched to a low heating value LO and a high heating value HI. The electrical heater 20 is maintained at the low heating value LO until 20 seconds passes after the starting of the heating operation of the electrical heater 20. After 20 seconds pass after the heating operation of the electrical heater 20 starts, the heating operation is switched to the high heating value HI.

In the present example, each of the compressor 27 and the electrical water pump 36 is operated by an ON-OFF control, as shown in FIGS. 5C and 5E. Therefore, each of the compressor 27 and the electrical pump 36 is re-started by a normal control level, and the normal control level is maintained during the operation of the compressor 27 and the electrical pump 36.

According to the second embodiment, the plural air-conditioning electrical devices are started from the small operation levels, respectively, at the same time after the output of the air-conditioning prohibition signal is stopped. Thereafter, the operation level of at least one electrical device is gradually increased toward the necessary level required for performing air-conditioning operation in the passenger compartment. Therefore, when the air-conditioning electrical devices are started after the air-conditioning prohibition signal is released, the power consumption of the air-conditioning electrical devices is not increased rapidly. Accordingly, in the second embodiment, it can prevent the repeat (hunting) of the re-starting operation of the air-conditioning electrical devices and the re-prohibiting operation thereof from being caused, similarly to the first embodiment.

In the second embodiment, when the air-conditioning electrical devices are started, the operation levels of the air-conditioning electrical devices are not limited only to the smallest levels, but may be set at levels slightly larger than the smallest levels, respectively. That is, the operation levels of the air-conditioning electrical devices can be set higher, in a range where an influence degree of the air-conditioning electrical devices relative to the residual charge amount of the main battery 6 is smaller than a predetermined degree.

Figure 6A:
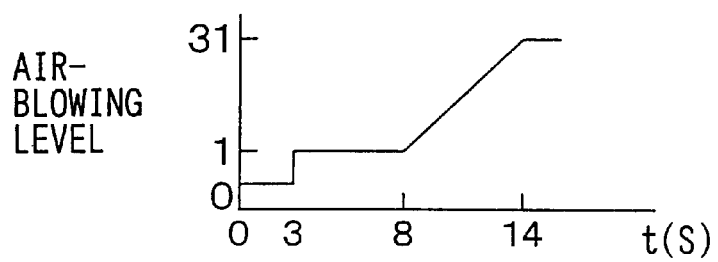
FIGS. 6A–6F are graphs showing control operations of various air-conditioning electrical devices after the air-conditioning prohibition signal is released, according to a third embodiment of the present invention.

A third embodiment of the present invention will be now described with reference to FIGS. 6A–6F. In the third embodiment, the different start-timing control according to the first embodiment and the start operation-level control according to the second embodiment are combined with each other. FIG. 6A shows a control operation of the front interior blower 16, FIG. 6B shows a control operation of the rear interior blower, FIG. 6C shows a control operation of the compressor 27, FIG. 6D shows a control operation of the exterior blower 31, FIG. 6E shows a control operation of the electrical water pump 36, and FIG. 6F shows a control operation of the electrical heater 20.

Figure 6B:
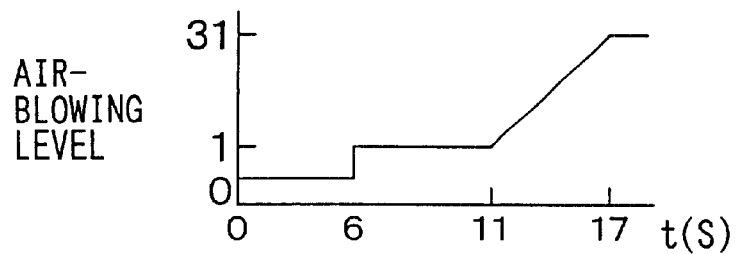
Figure 6C:
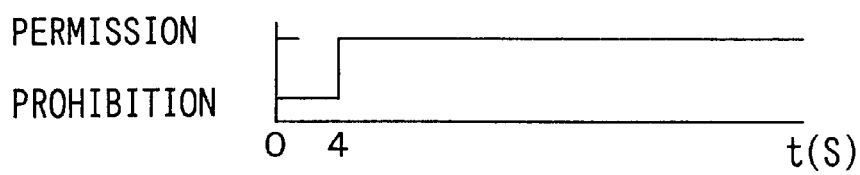
Figure 6D:
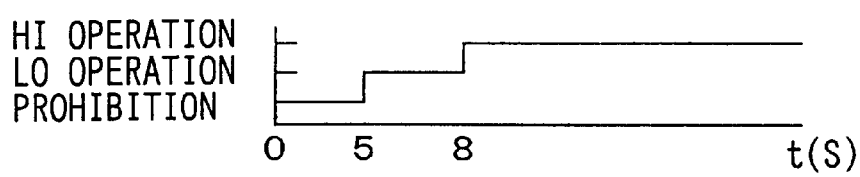
Figure 6E:
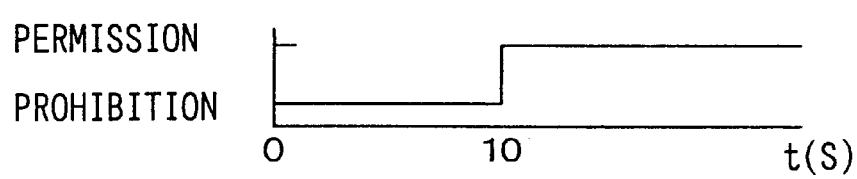
Figure 6F:
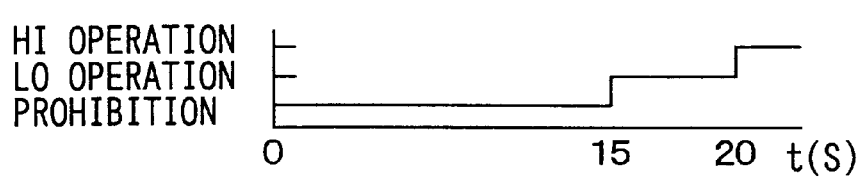

Specific control operations shown in FIGS. 6A–6F according to the third embodiment are performed at step S90 in FIG. 3, for example. When the passing time "t" is 3 seconds, the front interior blower 16 is started as shown in FIG. 6A. When the passing time "t" is 4 seconds, the compressor 27 is started as shown in FIG. 6C. When the passing time "t" is 5 seconds, the exterior blower 31 is started as shown in FIG. 6D. When the passing time "t" is 6 seconds, the rear interior blower is started as shown in FIG. 6B. When the passing time "t" is 10 seconds, the electrical water pump 36 is started as shown in 6E. Further, when the passing time "t" is 15 seconds, the electrical heater 20 is started as shown in FIG. 6F. That is, the plural air-conditioning electrical devices are started at the different start times, similarly to the above-described first embodiment, respectively. Further, the front interior blower 16, the rear interior blower, the exterior blower 31 and the electrical heater 20 are operated by predetermined small operation levels as in the second embodiment, respectively. Thereafter, the operation levels of the front interior blower 16, the rear interior blower, the exterior blower 31 and the electrical heater 20 are gradually increased, respectively.

Thus, in the third embodiment, the different start-timing control and the operation level control are combined to each other. In the different start-timing control, the plural air-conditioning electrical devices are started at different start times. In the operation level control, after the plural air-conditioning electrical devices are started by the small operation levels, respectively, the operation levels of the plural air-conditioning electrical devices are gradually increased toward the necessary levels, respectively. Therefore, the power consumption of the air-conditioning electrical devices can be restricted from being rapidly increased after the output of the air-conditioning prohibition signal is stopped.

Figure 7:
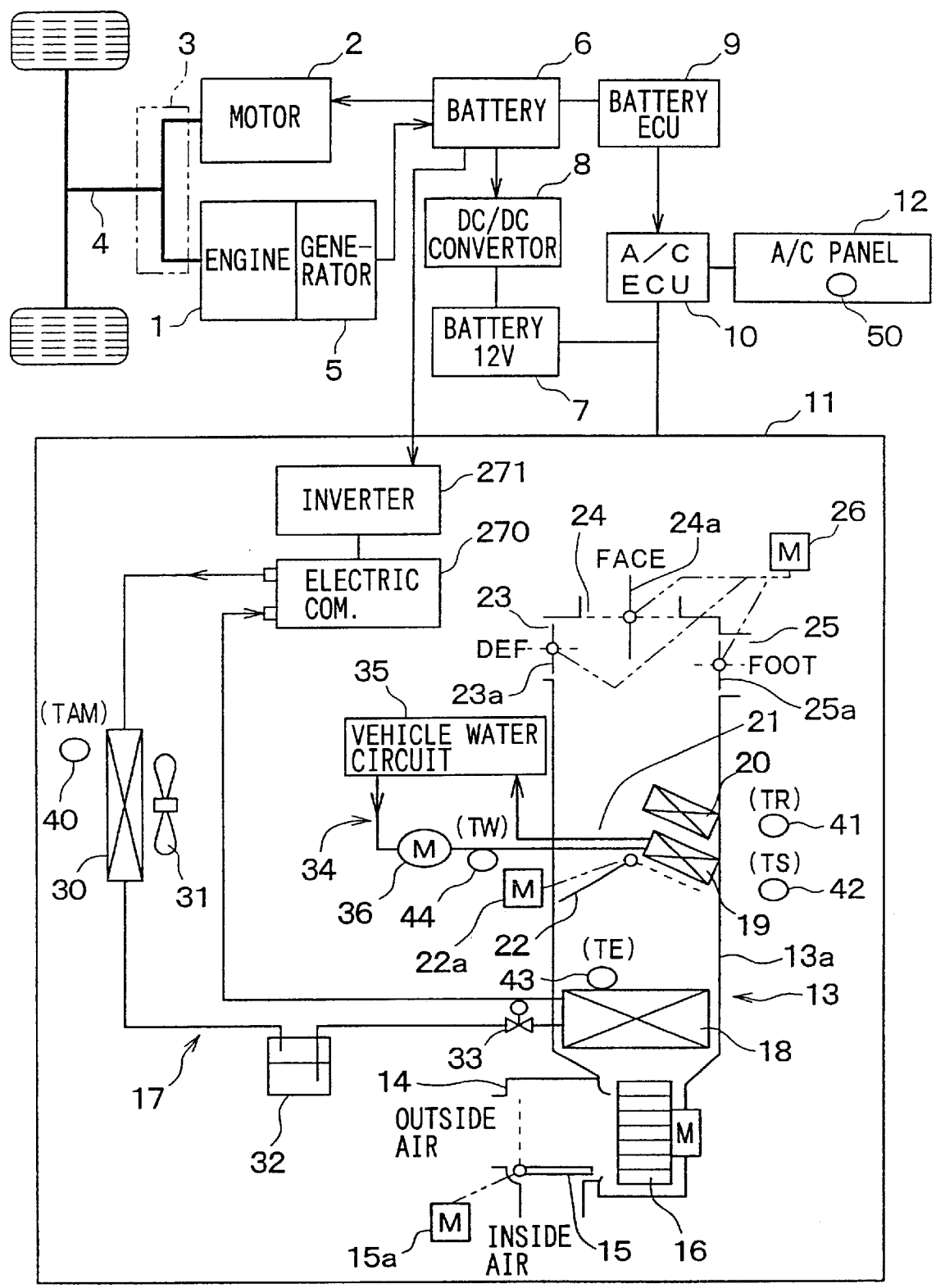
FIG. 7 is a schematic diagram showing an entire system according to a fourth embodiment of the present invention.

A fourth embodiment of the present invention will be now described with reference to FIGS. 7 and 8A–8F. As shown in FIG. 7, an electrical compressor 270 is used in place of the compressor 27 driven by the engine 1 through the belt 29. The electrical compressor 270 is integrated with a driving motor (three-phase AC motor). High-voltage direct-current electrical power from the main battery 6 is converted by an inverter 271 to a three-phase alternating current. The three-phase alternating current is supplied to the electrical compressor 270. The rotation speed of the electrical compressor 270 can be continuously controlled by the frequency control of the inverter 271.

Figure 8A:
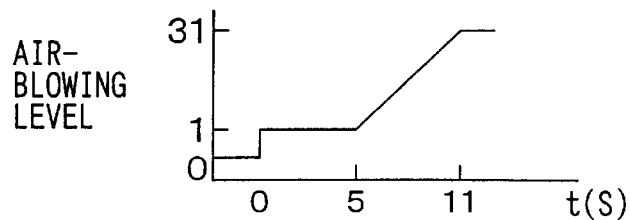
FIGS. 8A–8F are graphs showing control operations of various air-conditioning electrical devices after the air-conditioning prohibition signal is released, according to an fourth embodiment.
Figure 8B:
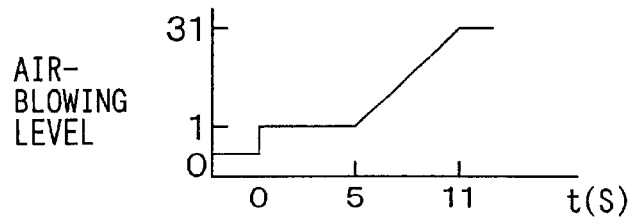
Figure 8C:
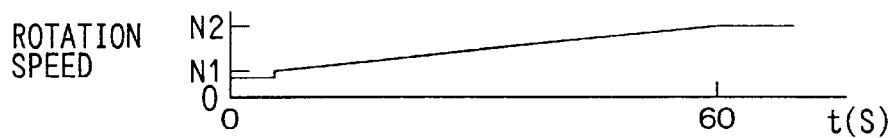
Figure 8D:
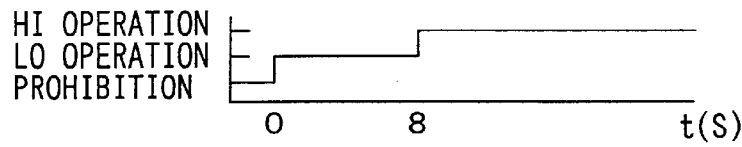
Figure 8E:
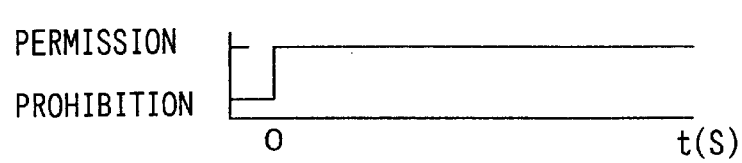
Figure 8F:
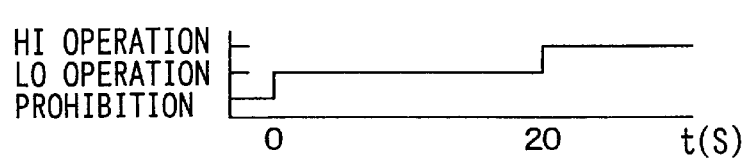

Specific control operations according to the fourth embodiment, shown in FIGS. 8A–8F, are performed at step S90 shown in FIG. 3. As shown in FIGS. 8A–8F, the specific control operations of the fourth embodiment are different from the specific control operations of the second embodiment shown in FIGS. 5A–5F only in the rotational speed control of the electrical compressor 270. That is, as shown in FIG. 8C, the electrical compressor 270 is started together with the other air-conditioning electrical devices at the same time directly after the output of the air-conditioning prohibition signal is stopped. However, at this time, the electrical compressor 270 is started at the smallest rotational speed N1 at which the electrical compressor 270 can be started. Thereafter, the rotational speed of the electrical compressor 270 is continuously increased toward the largest rotational speed N2 (e.g., 9000 rpm). For example, after the passing time "t" becomes 60 seconds, the rotation speed of the electrical compressor 270 is increased to the largest rotational speed N2 (e.g., 9000 rpm).

A fifth embodiment of the present invention will be now described with reference to FIGS. 9A–9F. Similarly to the above-described fourth embodiment, in the fifth embodiment, the electrical compressor 270 is used, and the control operation of the electrical compressor 270 shown in FIG. 8C and the other control operations shown in FIGS. 6A, 6B and 6D–6F of the above-described third embodiment are combined.

Figure 9A:
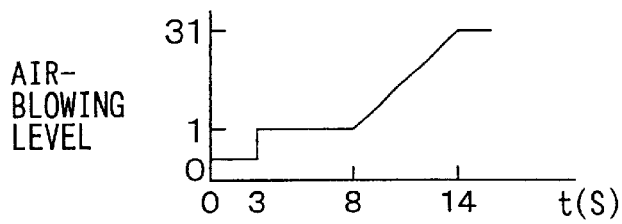
FIGS. 9A–9F are graphs showing control operations of various air-conditioning electrical devices after the air-conditioning prohibition signal is released, according to a fifth embodiment of the present invention.
Figure 9B:
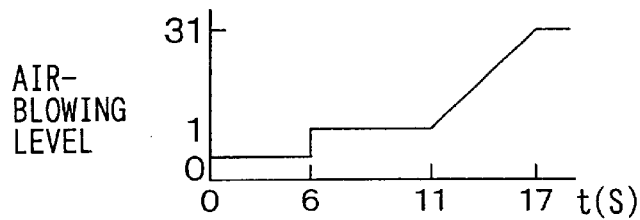
Figure 9C:
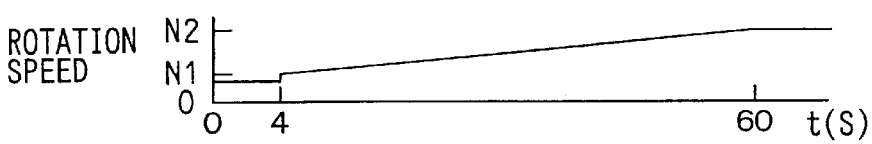
Figure 9D:
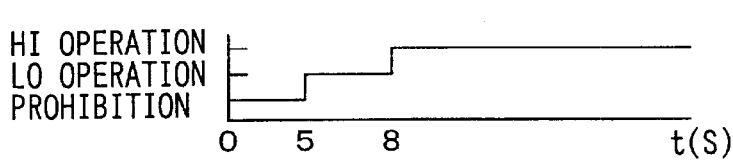
Figure 9E:
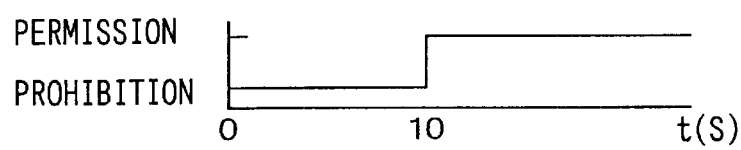
Figure 9F:
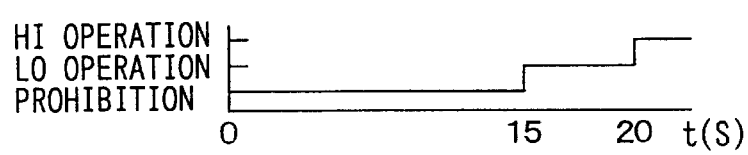

In the fifth embodiment, FIG. 9A shows a control operation of the front interior blower 16, FIG. 9B shows a control operation of the rear interior blower, FIG. 9C shows a control operation of the electrical compressor 270, FIG. 9D shows a control operation of the exterior blower, FIG. 9E shows a control operation of the electrical water pump 36, and FIG. 9F shows a control operation of the electrical heater 20.

Specific control operations according to the fifth embodiment, shown in FIGS. 9A–9F, are performed at step S90 shown in FIG. 3. The specific control operations in FIGS. 9A–9F are different from the specific control operations according to the third embodiment in FIGS. 6A–6F only in the rotational speed control of the electrical compressor 270 shown in FIG. 9C. As shown in FIG. 9C, when 4 seconds pass after the output of the air-conditioning prohibition signal is stopped, the electrical compressor 270 is started at the smallest rotational speed N1. Thereafter, the rotational speed of the electrical compressor 270 is continuously increased toward the largest rotational speed N2 (e.g., 9000 rpm). In the fourth and fifth embodiments, the air-conditioning operation can be re-started while the power consumption of the electrical compressor 270 is restricted.

Although the present invention has been fully described in connection with the preferred embodiments thereof with reference to the accompanying drawings, it is to be noted that various changes and modifications will become apparent to those skilled in the art.

For example, in the example shown in FIG. 2, the battery ECU 9 controls the output in accordance with the change of the residual charge amount of the main battery 6, set at the four threshold values. The threshold values for the battery ECU 9 are not limited to the four threshold values, but can be changed to various threshold values in accordance with the type of a vehicle and the like. For example, a threshold value of the residual charge amount, for outputting the power-generation command signal, is made to be identical to a threshold thereof for outputting the air-conditioning prohibition signal. That is, the power generation of the generator 5 and the operation stop of the air-conditioning electrical devices may be performed at the same time.

Further, a motor generator having a motor function and a power generation function may be used in place of both the driving motor 2 and the generator 5. That is, the motor generator has the power generation function, the motor function and a starter function. In the power generation function, the motor generator, driven by the engine 1, charges the main battery 6. In the motor function, the motor generator, energized by the main battery 6, drives a vehicle. In the starter function, the motor generator starts the engine 1.

Further, the present invention can be applied to a vehicle where a fuel cell is provided as the generator 5 and the main battery 6 is charged by the fuel cell. In the vehicle including the fuel cell, when the residual charge amount is reduced to a predetermined amount (e.g., 50%), the power-generation command signal is output to the fuel cell. The present invention can be used for a heat pump cycle system constructed to switch any one of a cooling mode and a heating mode.

In the above-described first embodiment of the present invention, the air-conditioning electrical devices are stopped at the same time when the air-conditioning prohibition signal is output from the battery ECU 9. However, when the air-conditioning prohibition signal is output, at least two of air-conditioning electrical devices can be stopped. That is, in the present invention, when the air-conditioning prohibition signal is output, consumption power consumed in the air-conditioning devices is reduced. Further, the air-conditioning electrical devices can be stopped at the same time, or can be stopped at different times slightly different from each other.

Such changes and modifications are to be understood as being within the scope of the present invention as defined by the appended claims.

What is claimed is:

1. A charging control system for a vehicle having a battery for supplying electric power and a generator for charging the battery, the system comprising:
    a plurality of air-conditioning electrical devices for performing an air-conditioning operation in a passenger compartment of the vehicle, the air-conditioning electrical devices being operated by electrical power from the battery; and
    an air-conditioning controller for controlling operations of the air-conditioning electrical devices, wherein:
        when a residual charge amount of the battery is reduced to a first predetermined amount, the air-conditioning controller stops the operations of the air-conditioning electrical devices, and the generator charges the battery; and
        when the residual charge amount of the battery is increased to be larger than the first predetermined amount after the air-conditioning electrical devices are stopped, the air-conditioning controller starts the air-conditioning electrical devices at different start times.

2. The charging control system according to claim 1, wherein the air-conditioning controller stops the air-conditioning electrical devices at the same time when the residual charge amount of the battery is reduced to the first predetermined amount.

3. The charging control system according to claim 1, wherein the air-conditioning controller starts the air-conditioning electrical devices by small operation levels, respectively, each of the small operation levels being smaller than a necessary operation level required for performing air-conditioning operation in the passenger compartment.

4. The charging control system according to claim 3, wherein the air-conditioning controller gradually increases operation levels of the air-conditioning devices from the small operation levels toward necessary operation levels required for performing air-conditioning operation in the passenger compartment, respectively.

5. The charging control system according to claim 1, wherein the air-conditioning controller increases operation levels of the air-conditioning devices stepwise from the small operation levels toward necessary operation levels required for performing air-conditioning operation in the passenger compartment, respectively.

6. The charging control system according to claim 1, wherein,
    when the residual charge amount of the battery is reduced to a second predetermined amount larger than the first predetermined amount, the generator is operated to charge the battery.

7. The charging control system according to claim 1, further comprising:
    an indicator for indicating an operation restriction of the air-conditioning electrical devices.

8. The charging control system according to claim 1, wherein the air-conditioning electrical devices are mounted on the vehicle having a motor for driving the vehicle by electrical power supplied from the battery, and an engine for driving the generator.

9. The charging control system according to claim 1, wherein the air-conditioning electrical devices are mounted on the vehicle where the generator is a motor generator for driving the vehicle by electrical power from the battery.

10. A charging control system for a vehicle having a battery for supplying electric power and a generator for charging the battery, the system comprising:
    a plurality of air-conditioning electrical devices for performing an air-conditioning operation in a passenger compartment of the vehicle, the air-conditioning electrical devices being operated by electrical power from the battery; and
    an air-conditioning controller for controlling operations of the air-conditioning electrical devices, wherein:
        when a residual charge amount of the battery is reduced to a first predetermined amount, the air-conditioning controller stops the operation of the air-conditioning electrical devices, and the generator charges the battery; and
        when the residual charge amount of the battery is increased to be larger than the first predetermined amount after the air-conditioning electrical devices are stopped, the air-conditioning controller starts the air-conditioning electrical devices at the same time by small operation levels, respectively, the small operation levels being smaller than necessary operation levels required for performing air-conditioning operation in the passenger compartment.

11. The charging control system according to claim 10, wherein the air-conditioning controller stops the air-conditioning electrical devices at the same time when the residual charge amount of the battery is reduced to the first predetermined amount.

12. The charging control system according to claim 10, wherein the air-conditioning controller gradually increases operation levels of the air-conditioning apparatuses from the small operation levels toward necessary operation levels required for performing air-conditioning operation in the passenger compartment, respectively.

13. The charging control system according to claim 10, wherein the air-conditioning controller increases operation levels of the air-conditioning devices stepwise from the small operation levels toward necessary operation levels required for performing air-conditioning operation in the passenger compartment, respectively.

14. The charging control system according to claim 10, wherein,
    when the residual charge amount of the battery is reduced to a second predetermined amount larger than the first predetermined amount, the generator is operated to charge the battery.

15. The charging control system according to claim 10, further comprising:

an indicator for indicating an operation restriction of the air-conditioning electrical devices.

16. A charging control system for a vehicle air conditioner having a plurality of air-conditioning electrical devices for performing an air-conditioning operation in a passenger compartment, the control system comprising:

a battery for supplying electric power to the air-conditioning electrical devices;

a generator for charging the battery;

a motor for driving the vehicle by electrical power from the battery; and a controller for controlling a residual charge amount of the battery, wherein:

when the residual charge amount of the battery is reduced to a first predetermined amount, operations of the air-conditioning electrical devices are stopped, the controller outputs a power generation command to the generator, and the generator charges the battery; and when the residual charge amount of the battery is increased to be larger than the first predetermined amount after the operations of the air-conditioning electrical devices are stopped, the air-conditioning electrical devices start at different start times.

17. The charging control system according to claim 16, wherein, when the residual charge amount of the battery is reduced to a second predetermined amount larger than the first predetermined amount, the controller outputs the power generation command to the generator, and the generator is operated to charge the battery.

18. The charging control system according to claim 16, further comprising an engine for driving the vehicle and for driving the generator, wherein the generator is driven by the engine when the controller outputs the power generation command.

19. The charging control system according to claim 16, wherein the generator and the motor are constructed by a motor generator having an electrical generation function and a motor generation function.

20. A charging control system for a vehicle air conditioner having a plurality of air-conditioning electrical devices for performing an air-conditioning operation in a passenger compartment, the control system comprising:

a battery for supplying electric power to the air-conditioning electrical devices;

a generator for charging the battery;

a motor for driving the vehicle by electrical power from the battery; and a controller for controlling a residual charge amount of the battery, wherein:

when the residual charge amount of the battery is reduced to a first predetermined amount, operations of the air-conditioning electrical devices are stopped, the controller outputs a power generation command to the generator, and the generator charges the battery; and when the residual charge amount of the battery is increased to be larger than the first predetermined amount after the operations of the air-conditioning electrical devices are stopped, air-conditioning electrical devices start at the same time by small operation levels, respectively, each of the small operation levels being smaller than a necessary operation level required for performing the air-conditioning operation in the passenger compartment.

21. A control method for controlling a residual charge amount of a battery for supplying elecric power to a plurality of air-conditioning electrical devices of a vehicle having a generator for charging the battery and a motor for driving the vehicle by electrical power from the battery, the control method comprising:

stopping operations of the air-conditioning electrical devices, and outputting a power generation command to the generator for charging the battery, when the residual charge amount of the battery is reduced to a first predetermined amount; and starting the operations of air-conditioning electrical devices in order at different start times when the residual charge amount of the battery is increased to be larger than the first predetermined amount after the operations of the air-conditioning electrical devices are stopped.

22. The control method according to claim 21, wherein the air-conditioning electrical devices start by small operation levels, respectively, each of the small operation levels being smaller than a necessary operation level required for performing air-conditioning operation.

* * * * *